United States Patent [19]

Meisel, Jr. et al.

[11] 4,379,674
[45] Apr. 12, 1983

[54] LOAD SKIDDING VEHICLE HAVING A POSITIONALLY BIASED GRAPPLE

[75] Inventors: Thomas C. Meisel, Jr.; Robert J. Price, both of Peoria, Ill.

[73] Assignee: Caterpillar Tractor Co., Peoria, Ill.

[21] Appl. No.: 292,099

[22] PCT Filed: Jul. 13, 1981

[86] PCT No.: PCT/US81/00950
§ 371 Date: Jul. 13, 1981
§ 102(e) Date: Jul. 13, 1981

[51] Int. Cl.³ .............................................. B66C 1/32
[52] U.S. Cl. ................................. 414/699; 414/733; 414/917; 294/88
[58] Field of Search ............... 414/699, 729, 731–733, 414/735, 738, 739, 917; 294/86 R, 88; 144/2 Z, 144/3 D, 34 R, 309 AC

[56] References Cited

U.S. PATENT DOCUMENTS

| | | | |
|---|---|---|---|
| 3,034,821 | 5/1962 | Hackett et al. | 294/88 |
| 3,211,065 | 10/1965 | Hunger | 414/733 X |
| 3,690,354 | 9/1972 | Moser | 144/34 R |
| 3,782,567 | 1/1974 | Likas | 294/88 X |
| 3,865,424 | 2/1975 | Jabkowski | 294/88 |
| 3,886,985 | 6/1975 | Iarocci et al. | 144/309 AC |
| 3,907,137 | 9/1975 | Korbel et al. | 214/147 R |
| 3,910,326 | 10/1975 | Tucek | 144/34 R |
| 3,939,886 | 2/1976 | Tucek | 144/3 D |
| 3,994,325 | 11/1976 | Cryder et al. | 144/3 D |
| 4,005,894 | 2/1977 | Tucek | 414/731 X |
| 4,077,445 | 3/1978 | Wirt | 144/3 D |
| 4,140,233 | 2/1979 | Muntjanoff | 414/731 |
| 4,201,510 | 5/1980 | Muntjanoff | 414/730 |
| 4,217,076 | 8/1980 | Robnett et al. | 414/735 |

OTHER PUBLICATIONS

ASN 270,533 Filed Dec. 4, 1980—Muntjanoff et al., "Dampened Fully Pivotal Hanger for a Grapple".
ASN 250,742 Filed Aug. 20, 1980—Meisel, et al. for "Load Skidding Vehicle".

Primary Examiner—Robert J. Spar
Assistant Examiner—Terrance L. Siemens
Attorney, Agent, or Firm—Joseph W. Keen

[57] ABSTRACT

A load skidding vehicle (10) utilizing a grapple assembly (28) for grasping loads. The grapple assembly (28) is pivotally connected to a boom (24) which extends rearwardly from and is connected to a chassis (12). The grapple assembly (28) is pivotable relative to the boom (24) by a hydraulic cylinder (36) connected to the grapple assembly (28) and chassis (12). Displacement of the hydraulic cylinder (36) provides pivoting of the grapple assembly (28) to an optimum load skidding position. Means (66,68,70,72,78,62',68') are provided for maintaining the optimum skidding position for the grapple assembly (28) with a biasing force during skidding by permitting the grapple assembly (28) to pivot away from the initial skidding position when a predetermined skidding force is encountered. When the skidding force falls below the biasing force magnitude, the grapple assembly (28) is again pivoted toward the initially set skidding position.

9 Claims, 10 Drawing Figures

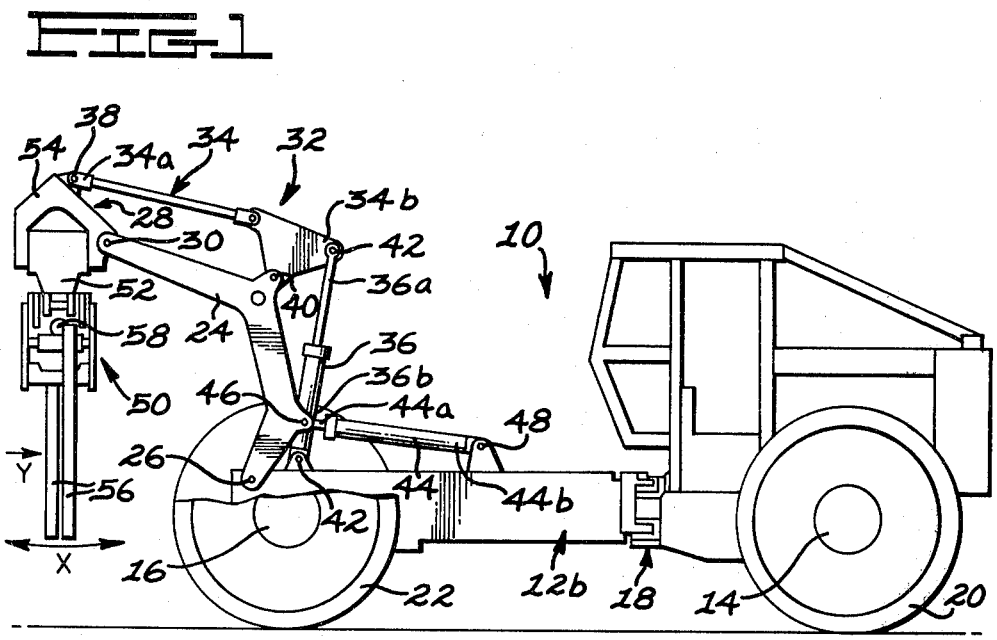

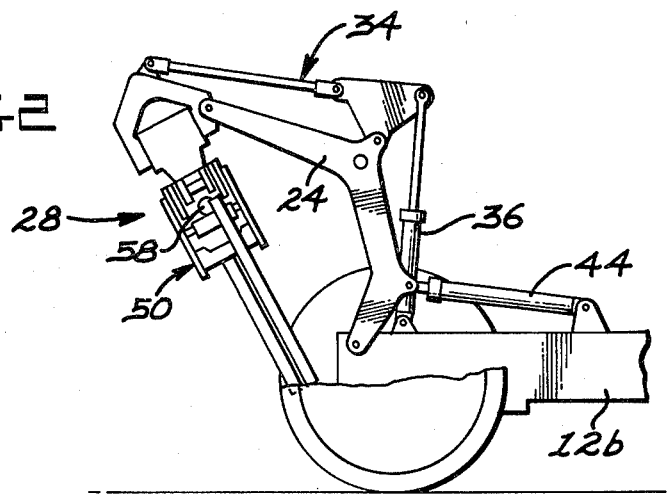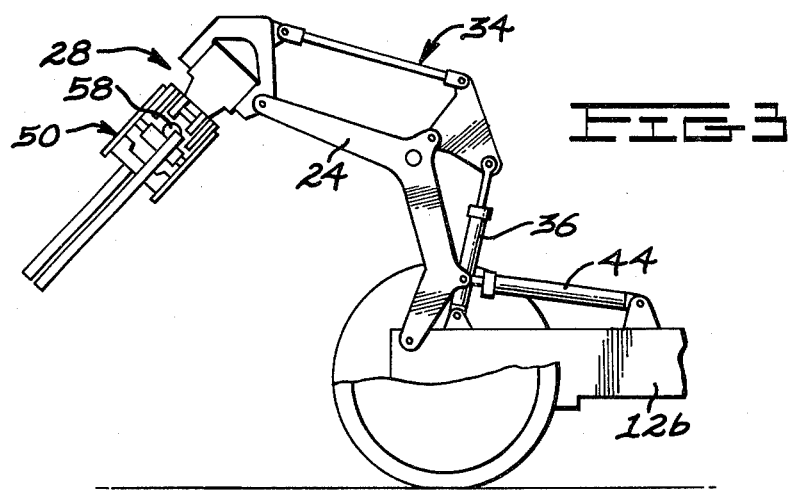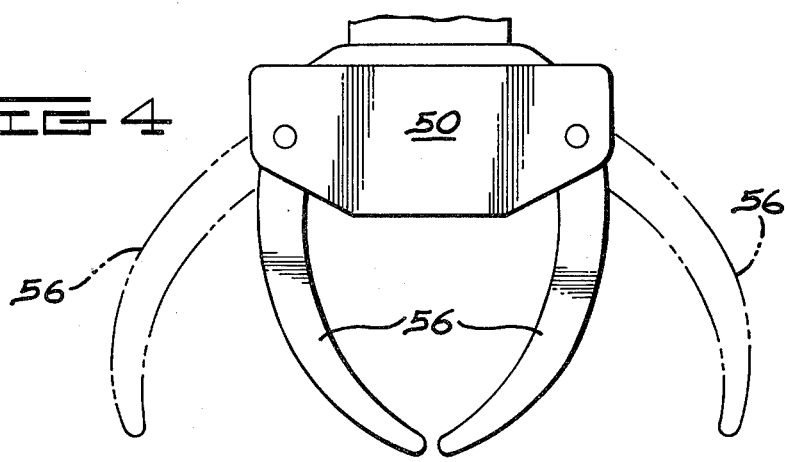

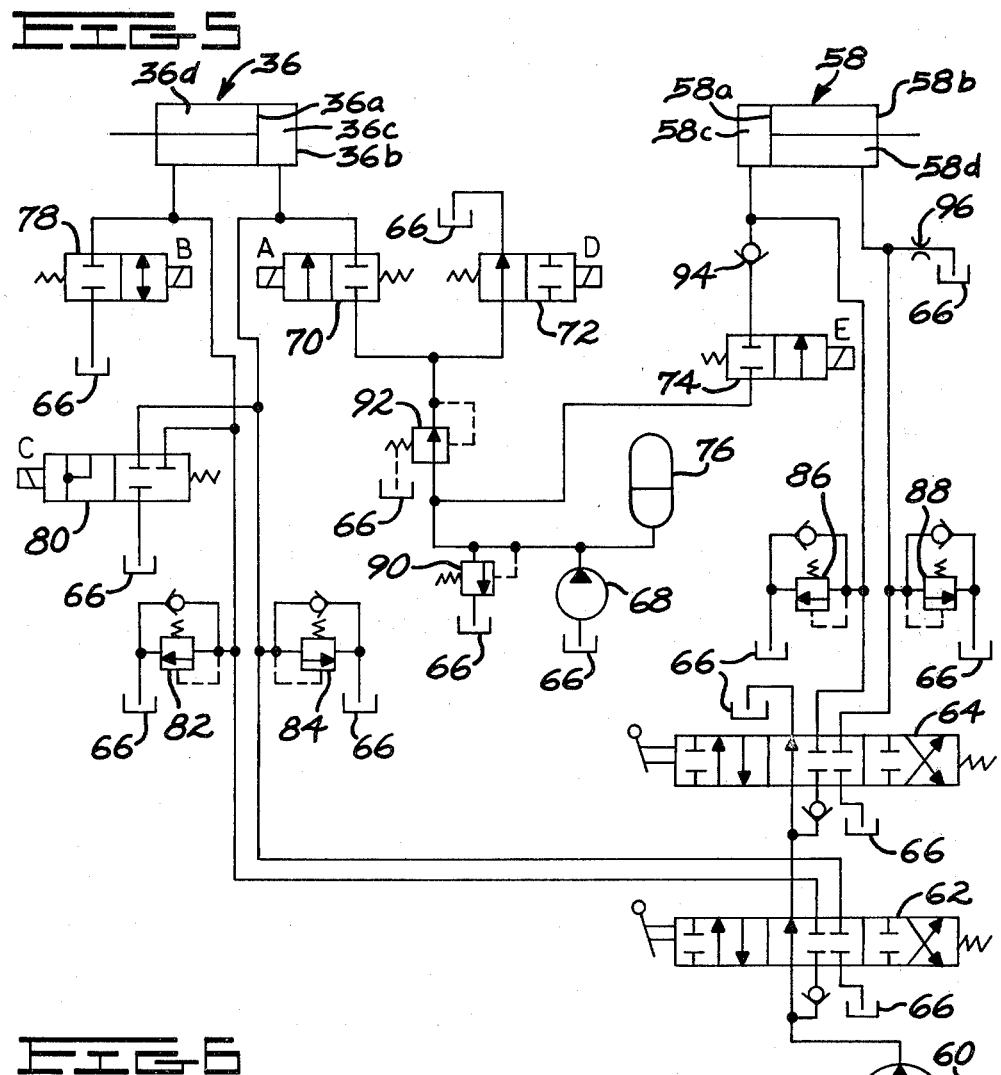
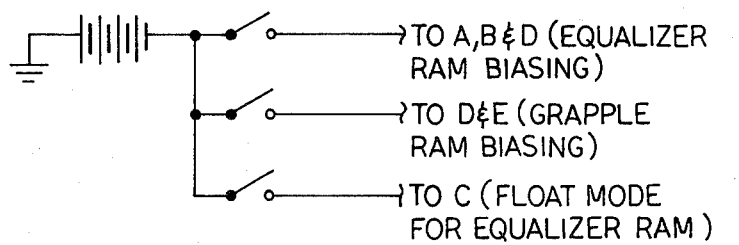

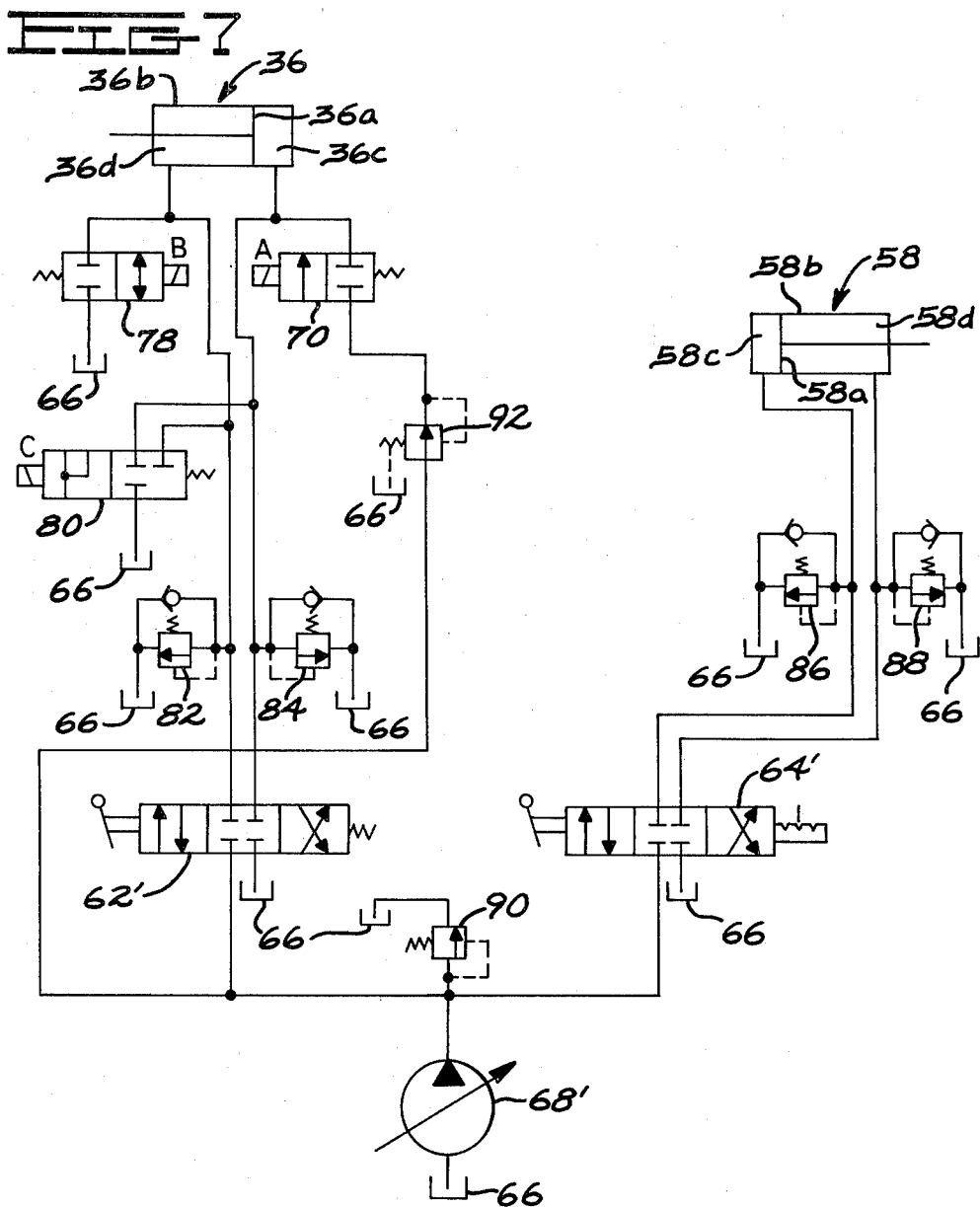
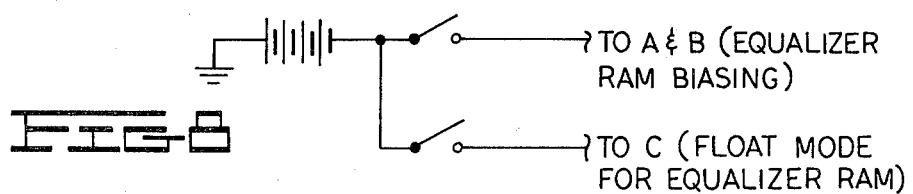

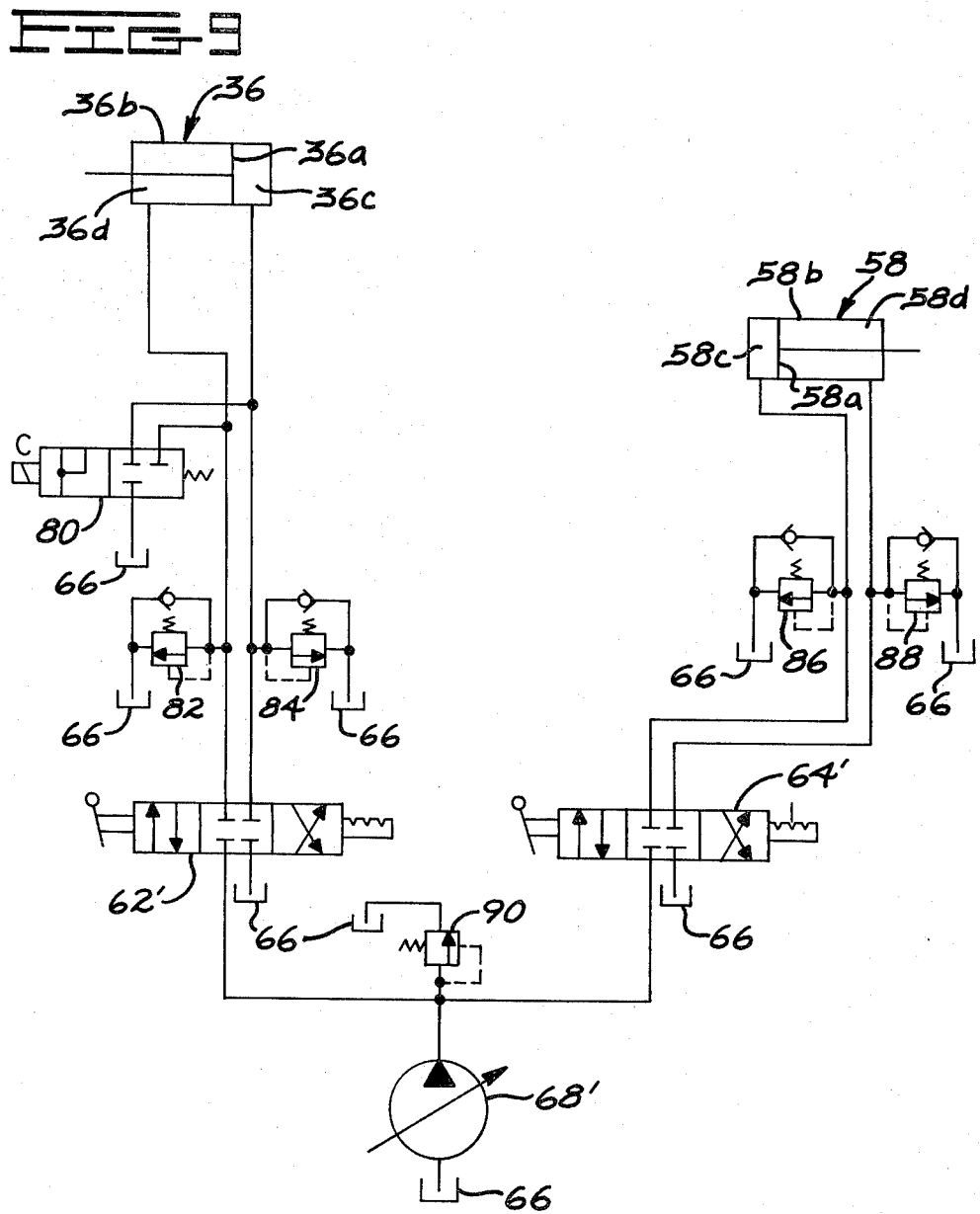
FIG-9
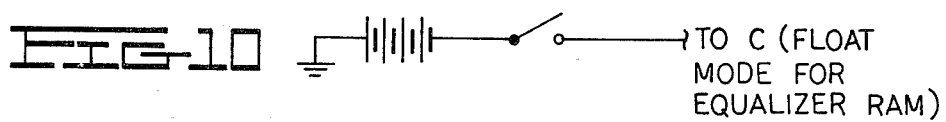
FIG-10  TO C (FLOAT MODE FOR EQUALIZER RAM)

LOAD SKIDDING VEHICLE HAVING A POSITIONALLY BIASED GRAPPLE

DESCRIPTION

1. Technical Field

This invention relates to load skidding vehicles having a chassis and a load grasping grapple, and, more particularly, to an apparatus for biasing the grapple to an optimum skidding position relative to the chassis during a load skidding operation.

2. Background Art

In certain classes of hauling operation such as moving harvested trees from their felling point to a collection point, there is often no feasible means of transporting a load other than by dragging it behind a vehicle. This is generally accomplished either by attaching the load to a load skidding vehicle (skidder) with a cable or by grasping the load with a grapple suspended from an elevated support boom carried by the vehicle chassis. Typical skidders have a front and rear axle each of which is supported on at least two wheels. Basic examples of grapple assemblies for use in load skidding applications are set forth in U.S. Pat. No. 3,620,394 which issued to Symons, et al. on Nov. 16, 1971, and U.S. Pat. No. 3,513,998 which issued to Stone, et al. on May 26, 1970.

Previously, grapple equipped skidders had a relatively smaller load capacity as compared to otherwise equivalent cable skidders. Such relatively smaller grapple skidder capacity resulted from the skidding load being born by the skidding vehicle at a comparatively high pivot point from which the grapple was suspended. Exertion of the skidding load at the elevated pivot point caused a substantial overturning moment to exist about the rearmost ground contacting point (rear tires' contacting points) of the loaded skidding vehicle. Such overturning moment tended to lift the front of the grapple skidder from the ground and thus reduce the traction of the grapple skidder's front wheels.

U.S. Pat. No. 4,140,233 which issued to Muntjanoff, et al. on Feb. 20, 1979, illustrates a force application arm attached to the vehicle for applying a downward force on the load at a point located rearwardly from the grapple. Activating the arm provided a reactive force tending to equalize the load distribution on the front and rear axles of the skidding vehicle. A copending U.S. patent application Ser. No. 258,504, filed Apr. 29, 1981, by Meisel, et al. illustrates a mechanism for pivoting the grapple relative to a supporting boom and vehicle chassis and locking the grapple in a desired relationship with the chassis. Such grapple pivoting is provided by an equalizing cylinder (hydraulic) and cooperating linkage joined between the cylinder and grapple. For most skidding applications the optimum position for the grapple is one in which the grapple is pivoted forwardly toward the vehicle chassis so as to push the distal (dragged) end of the load against the ground with a predetermined force. The load element (often logs) of Meisel, et al. tends to act as a structural compression member of the skidding vehicle by extending rearwardly from the chassis and into ground contact behind the rear wheels to resist the overturning moment exerted on the vehicle chassis. The load element must then be pushed into the ground to permit the front axle of the skidder to raise. Field tests of such equalizer cylinder and cooperating linkage exhibited drawbar capability improvements of skidder vehicles of between 50 and 70% as compared with equivalent skidders conventionally equipped.

While skidders having such pivotable, locking grapples perform admirably on flat ground, significant difficulties would be encountered when the skidders utilizing the aforementioned pivotable grapple either crested a ridge or forded the low point in a valley. In the former case with the grapple locked in the close-to-vehicle skidding position, the skidder would tend to raise the entire load from the ground and thus caused the skidder's front axle to rise from the ground. In the latter case as the skidder's front axle traversed the valley's low point and started climbing the adjacent slope, the skidded load would be forced against and into the ground so as to increase the skidding load as the dragged object increasingly penetrated the ground surface. Appropriate manipulation of the equalizing cylinder by the operator during ridge cresting and valley traversing would require quick reaction to changing ground conditions. It may be impossible for the skidder operator to devote the necessary level of attention to adjusting the equalizing cylinder and cooperating linkage during such valley traversal and ridge cresting due to his encountering other problems at those times associated with maneuvering the skidder. The present invention is directed to overcoming one or more of the problems previously set forth.

DISCLOSURE OF THE INVENTION

In one aspect of the present invention a load skidding vehicle having a chassis which is supported by ground engaging members such as wheel assemblies is provided with a boom pivotally mounted to the chassis and a load grasping device pivotally connected to the boom. Apparatus is also provided for biasing the load grasping device toward a predetermined pivotal position relative to the chassis so as to optimize the load's position relative to the vehicle and optimumly distribute the load among the vehicle's ground engaging members.

BRIEF DESCRIPTION OF THE DRAWINGS

FIG. 1 is a side elevation view of an exemplary load skidding vehicle;

FIG. 2 is a partial side elevation view of the load skidding vehicle of FIG. 1 illustrating a forward pivotal position of a grasping apparatus attached thereto;

FIG. 3 illustrates the apparatus of FIG. 2 but illustrates the load grasping apparatus pivoted to a rearward position;

FIG. 4 is an elevational view of the load grasping apparatus as viewed from the vantage point indicated by the arrow Y of FIG. 1;

FIG. 5 is a schematic view of an open center hydraulic system used to pivotally move and pivotally bias the grasping means and open and close the grasping means;

FIG. 6 is a schematic representation of an electrical system used to actuate various solenoid actuated valves of the hydraulic system of FIG. 5;

FIG. 7 is a schematic view of a closed center hydraulic system used to pivotally move and pivotally bias the grasping apparatus and open and close the grasping means;

FIG. 8 is a schematic representation of an electrical system used to actuate various solenoid actuated valves of the hydraulic system of FIG. 7;

FIG. 9 is a schematic view of an alternate embodiment to the closed center hydraulic system of FIG. 7; and FIG. 10 is a schematic representation of an electrical system for actuating a valve of the hydraulic system of FIG. 9

BEST MODE FOR CARRYING OUT THE INVENTION

Referring now to FIG. 1, an articulated load skidding vehicle 10 having a chassis 12 supported by a front and a rear axle 14 and 16, respectively, is illustrated. The chassis 12 has front and rear chassis portions 12a and 12b, respectively, which are articulated at a center joint 18 which, for purposes of the present invention, may permit single axis pivoting or multiple axis pivoting. The front axle 14 is supported by the front chassis 12a and has mounted thereon a pair of front wheel assemblies 20 while the rear axle 16 is supported by the rear chassis 12b and has mounted thereon a pair of rear wheel assemblies 22. While a wheel supported load skidding vehicle is illustrated, it is to be understood that a track supported, load skidding vehicle could utilize the present invention with equal facility. A boom 24 is pivotally mounted at a joint 26 to the rear chassis 12b, extends generally rearwardly, and is preferably of the illustrated "A frame" type.

Load grasping means such as the illustrated grapple assembly 28 is pivotally mounted to the support boom 24 at a pivotal connection 30. Means 32 are provided for pivoting the grapple assembly 28 about the pivotal connection 30 along the path X and may be seen to include a cooperating linkage 34 and a hydraulic equalizer ram 36. The linkage 34 is pivotally connected at a joint 38 to the grapple assembly 28, to the boom 24 at a pivotal connection 40, and to one end of the hydraulic ram 36 (a piston portion 36a is illustrated) at a pivotal connection 42. The hydraulic equalizer ram 36 includes the piston 36a and a cylinder 36b which is preferably pivotally mounted to the chassis 12b at a pivotal connection 42. A hydraulic boom ram 44 includes a piston 44a and a cylinder 44b which are respectively pivotally mounted to the boom 24 at a pinned joint 46 and to the rear chassis 12b at a pinned connection 48.

The grapple assembly 28 includes a grapple 50, a rotator 52, and a vertical extender 54. The vertical extender 54 is preferably attached to the rotator 52 and preferably constitutes the sites for the pivotal connections 30 and 38 with the boom 24 and linkage 34 respectively. The rotator 52 rotatably positions the grapple 50 to facilitate load pick up and manipulation thereof by the grapple 50. A pair of grapple tongs 56 (better illustrated in FIG. 4) and means such as a hydraulic grapple ram 58 for opening and closing the grapple tongs 56 together constitute the grapple 50. The grapple ram 58 includes a piston 58a and a cylinder 58b which are pivotally connected between the grapple tongs 56. Additional description of other embodiments of load skidders using means for pivoting the grapple assembly 28 relative to the boom 24 is provided in a commonly assigned, copending application Ser. No. 258,504, filed Apr. 29, 1981 with such description, to the extent it is needed, being herein incorporated by reference.

FIGS. 2 and 3 respectively illustrate forwardly and rearwardly pivoted positions of the grapple 50. The grapple positions illustrated in FIGS. 2 and 3 are two of the infinite number of positions assumable along the illustrated path X of FIG. 1. Movement of the grapple 50 along the path X is provided by suitable actuation of the equalizer cylinder 36 and associated linkage 34. The grapple tongs 56 of the grapple 50 may be moved between a closed, load captured configuration of minimum opening (illustrated in full in FIG. 4) and an open, load released configuration (illustrated in phantom in FIG. 4) by suitable actuation of the grapple ram 58.

An open center hydraulic system for actuating the equalizing ram 36 and the grapple ram 58 is schematically illustrated in FIG. 5. The equalizing piston 36a divides the interior of the equalizing cylinder 36b into two fluid tight portions, 36c and 36d while the grapple piston 58a divides the grapple cylinder 58b into two fluid tight portions 58c and 58d. Pressurized fluid provided by a pressurized fluid supply means such as a pump 60 is received by a three position valve 62 which is capable of providing fluid communication to a three position grapple valve 64 or providing fluid communication to either portion (36c or 36d) of the equalizing cylinder 36 and providing fluid communication from the other cylinder portion (36c or 36d) to a reservoir 66 from which the pump 60 draws fluid. The three position grapple valve 64 provides fluid communication from the pump 60 directly to the reservoir 66 or provides fluid communication from the pump 60 to either portion (58c or 58d) of the grapple cylinder 58 as well as providing fluid communication from the other grapple cylinder portion (58c or 58d) to the reservoir 66. A second pressurized fluid supply means such as pump 68 draws fluid from the reservoir 66 and supplies it to the valves 70, 72, and 74 as well as to an accumulator 76. The open center pump 68 has a substantially lower flat rate than the pump 60 for reasons to be discussed hereinafter.

The valve 70 either provides or obstructs fluid communication between the pump 68 and the equalizing cylinder portion 36c. The valve 72 either provides fluid communication or obstructs fluid communication between the pump 68 and the reservoir 66. The valve 74 either provides fluid communication between the pump 68 and the grapple cylinder portion 58c or obstructs fluid communication therebetween. A valve 78 selectively provides fluid communication between the equalizer cylinder portion 36d and the reservoir 66 or obstructs fluid communication therebetween. A valve 80 selectively provides fluid communication between the equalizer cylinder portions 36c and 36d or obstructs fluid communication therebetween. When the valve 80 provides fluid communication between the equalizer cylinder portions 36c and 36d, it also provides fluid communication among the equalizer cylinder portions 36c and 36d and the reservoir 66. The valves 70, 72, 74, 78, and 80 are schematically illustrated, and preferably constitute valves which are respectively actuated by energizing solenoids A, D, E, B, and C, but it is to be understood that any suitable actuation method may be used for regulating the valve modes.

Pressure relief-makeup valves 82, 84, 86, and 88 are in open fluid communication with the equalizer and grapple cylinder portions 36d, 36c, 58c, and 58d respectively. A pressure relief valve 90 is in fluid communication with the discharge side of the pump 68 and a pressure reducing valve 92 regulates the pressure of the fluid provided to the valves 70 and 72 by the pump 68 to a predetermined pressure. A check valve 94 insures that any fluid flow between the valve 74 and the grapple cylinder portion 58c is from the valve 74 to the grapple cylinder portion 58c. An orifice 96 provides open, but regulated fluid communication between the grapple cylinder portion 58d and the reservoir 66. The schematically illustrated hydraulic system of FIG. 5 is referred to as an open center system since the pumps 60 and 68 supply a substantially constant fluid flow which must be transmitted either to a fluid utilizing apparatus such as a hydraulic ram or to the reservoir 66.

FIG. 6 is an electrical schematic for indicating which valve solenoids are to be actuated together for various modes on the open center hydraulic system of FIG. 5. Additional discussion directed toward valve actuation during operation of the load skidding vehicle will be provided hereinafter.

FIG. 7 is known in the art as a closed center hydraulic system. It is to be understood that like reference characters indicate like elements and that each primed reference character indicates an element having a similar function to, but different structure from, the corresponding unprimed reference character. As can be seen in FIG. 7, a variable displacement pump 68' supplies pressurized fluid to a valve 62', a valve 64', and a valve 70. Due to the variable displacement feature of the pump 68', the valve 62' needs one fewer port for each of its three possible positions as compared with the valve 62. Likewise, valve 64' requires one fewer port for each of the three possible valve positions as compared with valve 64. Means such as detents are provided for holding the valve 64' in its rightmost configuration. During nonmovement or nonactuation of the hydraulic pistons 36a and/or 58a, the variable displacement pump 68' adjusts its output flow rate accordingly. Fluid still flows from pump to reservoir, but amount is considerably reduced under load thus reducing horsepower requirements of the pump. Fluid supplied to the valve 62' can be selectively communicated to either of the equalizer cylinder portions 36c or 36d while providing fluid communication from the other equalizer cylinder portion to the reservoir 66. Likewise, pressurized fluid supplied to the valve 64' can be selectively transmitted to either grapple cylinder portion 58c or 58d while simultaneously providing fluid communication between the remaining grapple cylinder portion and the reservoir 66.

The valve 70 may be selectively actuated (by energizing the solenoid A) to either provide fluid communication between the pump 68' and the equalizer cylinder portion 36c or obstruct such fluid communication. The valve 78 is selectively actuatable (by energizing the solenoid B) to provide or obstruct fluid communication between the equalizer cylinder portion 36d and the reservoir 66 while the valve 80 is selectively actuatable (by energizing the solenoid C) to provide or obstruct fluid communication among the equalizer cylinder portions 36c and 36d and the reservoir 66.

As compared with the open center hydraulic system of FIG. 5, use of the variable displacement pump 68' permits elimination of the valves 72 and 74 (illustrated in FIG. 5), and eliminates the need for the accumulator 76. Also, when the pump 68 of the open center system is increased in size, made variable displacement, and rearranged as illustrated in FIG. 7 to assume the position indicated as 68', then the main pump 60 of FIG. 5 can be eliminated.

FIG. 8 is an electrical schematic which indicates which valve solenoids are to be actuated together for various modes on the closed center hydraulic system of FIG. 7. Discussion of the same will be presented hereinafter.

FIG. 9 is a modified version of the closed center system of FIG. 7 wherein the valves 70 and 78 and the pressure reducing valve 92 have been eliminated. The valve 62' of FIG. 9 has been provided with means such as detents for holding the valve 62' in its leftmost configuration.

FIG. 10 is an electrical schematic which indicates a valve solenoid (C) which is actuatable to provide a float mode for the equalizer ram 36. Discussion of the same will be presented hereinafter.

INDUSTRIAL APPLICABILITY

Operation of the load skidding vehicle 10 and the hydraulic systems illustrated in FIGS. 5, 7, and 9 will be described in a manner reflecting the loading, skidding, and unloading of a group of logs. The boom ram 44 is manipulated to adjust the height of the grapple 50 above the log or logs to be loaded. At such time the solenoid C is typically energized so as to actuate the valve 80 for the open and the closed hydraulic systems to equalize the pressure on both sides of the equalizer ram 36 and thus cause the grapple 50 to assume a vertical position as illustrated in FIG. 1. If, however, the logs are on uneven ground or are disposed in a position other than horizontal, the solenoid C is deactivated and the valves 62 and 62' are actuated by the operator to adjust the position of the grapple 50 to a desired position along the path X. When a desired grapple position is attained, the valves 62 and 62' are returned to the illustrated, nonactuated position wherein the grapple position relative to the boom 24 is locked in place.

The grapple tongs 56 are then moved to the open configuration as illustrated in phantom in FIG. 4 by actuating the valves 64 and 64' to their leftmost position so as to provide fluid flow from the pumps 60 and 68' to the grapple cylinder portion 58d. The hydraulic boom ram 44 is then further manipulated to properly position the grapple 50. When it is desired to close the grapple tongs 56, the valves 64 and 64' are operator actuated to their rightmost position in which fluid communication is provided from the pumps 60 and 68' to the grapple cylinder portion 58c and from the grapple cylinder portion 58d to the reservoir 66. When the grapple tongs 56 have encompassed a group of logs and occupy a closed configuration similar to that illustrated in full in FIG. 4, the valve 64 is returned to the illustrated, nonactuated position (preferably by the schematicized spring) in which the grapple tongs 56 are locked into place. The valve 64' of FIGS. 7 and 9 is detented in position so as to provide a continuing biasing force tending to close the tongs 56 to their minimum opening.

The hydraulic boom ram 44 is manipulated to raise the grasped end of the log(s) from the ground to the desired dragging height. The valves 62 and 62' are then operator actuated to their leftmost position and fluid communication is provided from the pump 60 and the pump 68' to the equalizer cylinder portion 36c and from the equalizer cylinder portion 36d to the reservoir 66. When the desired log skidding position such as that illustrated in FIG. 2 is obtained, the valves 62 and 62' are returned to their illustrated nonactuated position in which the equalizer ram 36 (and thus grapple 50) is locked in position relative to the boom 24 and chassis 12b. Providing the illustrated (FIG. 2) relative position between the grapple 50 and the boom 24 enables realization of a 50 to 90% improvement over conventional grapple equipped log skidders having no equalizer cylinder 36 and associated linkage 34. However, when rapidly changing ground slopes are encountered, the positionally locked mode for the grapple 50 relative to the chassis 12b has disadvantages previously alluded to. To avoid such disadvantages the hydraulic equalizer ram 36 is unlocked and placed in a biasing mode. This also results in a reactive force on the log(s) which tends to further equalize the load on the vehicle's ground engaging members (track or wheels).

For the open center system of FIG. 5 biasing the equalizer cylinder 36 toward the skidding position illustrated in FIG. 2 is initiated by actuating the valves 70, 72, and 78 from their illustrated, nonactuated position preferably by energizing the solenoids A, D, and B as indicated in FIG. 6. Upon such valve actuation pressurized fluid from the pump 68 is fluidly communicated to the equalizer cylinder portion 36c by the valve 70 while the valve 72 obstructs fluid communication from the pump 68 to the reservoir 66. The valve 78, when actuated by energizing the solenoid B, provides fluid communication between the equalizer cylinder portion 36d and the reservoir 66. When in the biasing mode, the equalizer ram 36 tends to move the grapple 50 toward the position illustrated in FIG. 2, but will permit pivotal movement thereof about the pin connection 30 to a relatively rearward position along the path X when the forces exerted on the grapple 50 by the skidded load surpass the forces exerted by the equalizer ram 36. The biasing force of the equalizer ram 36 on the grapple 50 is substantially independent of the position of the grapple 50 and has an essentially constant magnitude.

As previously described, such increased skidding forces typically occur after cresting a hill or when fording a valley. Movement of the grapple 50 in a rearward direction causes the equalizer cylinder portion 36c to diminish in size and the equalizer cylinder portion 36d to increase in size. The displaced volume of fluid from the equalizer cylinder portion 36c is transmitted to the reservoir 66 through the pressure relief valve 90. When the load skidding forces return to lower magnitudes (which are typical for the greatest percentage of skidding operations), the equalizer piston 36a is displaced to the left as illustrated in FIGS. 5, 7, and 9 so as to return the grapple 50 to the preferred skidding position relative to the chassis 12b. When the equalizer ram 36 is in the biasing mode and the volume of the cylinder portion 36c either remains constant or diminishes in size, the flow volume at the discharge pressure from the pump 68 is throttled through the pressure relief valve 90 to the reservoir 66. To minimize the energy expended in such throttling the pump 68 is of minimum size (approximately 10% as much flow) as compared to the main pump 60. A discharge pressure from the pump 68 of approximately 2500 psi and a biasing pressure of approximately 1000 psi downstream from the pressure reducing valve 92 permit the use of an equalizer ram 36 of reasonable size as compared to the utilizing skidding vehicle 10.

When the biasing mode of the equalizer ram 36 is desired for the closed center system of FIG. 7, the valves 70 and 78 are actuated by energizing the solenoids A and B to provide fluid communication between the variable displacement pump 68' and the equalizer cylinder portion 36c as well as between the equalizer cylinder portion 36d and the reservoir 66. The remaining elements associated with the equalizer ram's biasing mode fluid circuit in FIG. 7 cooperate as do the corresponding elements of FIG. 5.

When the biasing mode of the equalizer ram 36 is desired for the modified closed center system of FIG. 9, the valve 62' is held in the leftmost position by the valve's detents. In such detented position fluid communication is provided from the pump 68' to the equalizer cylinder portion 36c and from the equalizer cylinder portion 36d to the reservoir 66. Deletion of the valve 70, pressure reducing valve 92, and interconnecting conduit from the system of FIG. 7 subjects the equalizer cylinder portion 36c of FIG. 9 to full discharge pressure from the pump 68' rather than the reduced pressure provided by the pressure reducing valve 92. Providing a high pressure such as the full discharge pressure to the equalizer ram 36 to facilitate dislodgement of the skidding vehicle 10 from a stuck condition is desireable, but transmission of the same discharge pressure to the equalizer ram 36 during the biasing mode may inhibit, to an undesireable extent, the grapple assembly's pivoting action during valley fording and after hill cresting. For such reason the embodiment of FIG. 7 is preferred over the embodiment of FIG. 9.

When a log bunch has been grasped by the grapple tongs 56, the logs therein may be somewhat wedged together with voids of substantial size occurring thereamong. If the log bunch shifts to fill such voids, the cross-sectional area of the log bunch may substantially reduce in size and often permit loss of load from the grapple 50 in a direction along the longitudinal axis of the skidding vehicle 10. To prevent or at least minimize log loss it has been found desirable to bias the grapple tong ram 58 toward its closed, minimum opening as illustrated in full in FIG. 4.

The biasing mode for the open center system's grapple tongs 56 is obtained by energizing the solenoids D and E to actuate the valves 72 and 74, respectively, so as to obstruct fluid flow from the pump 68 to the reservoir 66 and to provide fluid flow from the pump 68 to the grapple cylinder portion 58c. Of course, if the equalizer ram 36 has already been placed in the previously described biasing mode, the valve 72 is already actuated and need not be reactuated to provide the biasing mode for the grapple ram 58. Since, unlike the equalizer ram's biasing mode, no enlargement of the log bunch after the initial grasp is to be permitted, fluid communication between the grapple cylinder portion 58d and the reservoir 66 is provided through the orifice 96. Additionally, the check valve 94 prevents fluid flow from the grapple cylinder portion 58c toward the discharge of the pump 68. Since the pump 68 is sized to provide a relatively small flow (approximately 10%) as compared to the main pump 60 and thus substantially reduces the power consumption thereof, the grapple ram's piston 58a must respond quickly to sudden shifts in the log bunch so as to prevent loss thereof. Due to the relatively small flow rate of the pump 68, the accumulator 76 is added to provide the high fluid flow rate of typically short duration which is required when a log bunch shift to a smaller cross-sectional size is encountered.

Placing the closed center hydraulic systems of FIGS. 7 and 9 into the grapple tong biasing mode is accomplished by moving the valve 64' to its rightmost position past detent so as to provide fluid communication between the pump 68' and the grapple cylinder portion 58c and between the grapple cylinder portion 58d and the reservoir 66. The remaining elements in the hydraulic circuit for the grapple biasing mode of the closed center system of FIGS. 7 and 9 cooperate and react as do the corresponding elements of the already described open center system of FIG. 5. The accumulator 76 of FIG. 5 need not be included in the illustrated closed center systems since the variable displacement pump 68' can respond rapidly to sudden shifts in the log bunch's cross sectional area to supply the high fluid flow rate required to quickly move the grapple tongs 56.

When the load skidding vehicle 10 reaches the log dump site, the biasing modes for the open center system is deactivated by deenergizing the solenoids A, D, B, and E which deactuate the valves 70, 72, 78, and 74, respectively. The equalizer and tong biasing modes for the closed center system of FIG. 7 are respectively deactivated by deenergizing the solenoids A and B (which deactuate the valves 70 and 78) and by moving the valve 64' to the illustrated position by overcoming the valve detents. The biasing modes for the system of FIG. 9 are deactivated by moving the valves 62' and 64' to the illustrated, deactuated positions by overcoming the valves' detents. Thereafter, the valves 62, 64, and 80 of the open center system and the valves 62', 64' and 80 of the closed center system are manipulated to maneuver and unload the log bunch.

While electrically actuated valves 70,72,74,78,80 have been illustrated, it is to be understood that other valve actuation means (including manually) may be used with equal facility—especially for the valve 80 since there is presently no anticipated cooperation or need to be simultaneously actuated with any other valve. It is to be further understood that the use of any other means for biasing the grapple assembly 28 toward the preferred skidding position with substantially constant force such as a hydrostatically driven winch or appropriately designed spring(s) system is considered to be equivalent to the illustrated embodiments.

It should now be apparent that an improved load skidding vehicle 10 has been provided which utilizes means for biasing the skidded load to an optimum skidding position and exerts a downward force on the distal end of the log(s) which tends to equalize the load on the vehicle's ground engaging members for level terrain as well as peaks and valleys. Biasing the skidded load with a predetermined force rather than locking the load into position relative to the boom 24 and chassis 12b can provide a 20 to 45% improvement in drawbar capability as compared with the locked equalizer ram alone. Biasing the grapple 50 (and thus the skidded load) permits the vehicle operator to devote his entire attention to maneuvering the skidding vehicle 10 rather than also having to manipulate the hydraulic controls when the vehicle encounters rapidly changing ground slopes. Additionally, the skidded load size is increased, the skidding vehicle 10 is made more productive, and the stability of the vehicle 10, when loaded, is enhanced.

We claim:

1. A load skidding vehicle (10) comprising:
   a vehicle chassis (12);
   a boom (24) mounted on said chassis (10);
   means (28) connected to said boom (24) for releasably grasping loads, said grasping means (28) being movable between an open, load releasing configuration and a closed, minimum opening load grasping configuration, said grasping means (28) including
      a pair of relatively movable tongs (56); and
      a fluid grapple ram (58) having a grasping cylinder (58b) and a grasping piston (58a) displaceably disposed in said grasping cylinder (58b), said grasping piston (58a) being connected to one of said tongs (56) and said grasping cylinder (58b) being connected to said other tong (56), said grasping piston (58a) dividing said grasping cylinder (58b) into a third (58c) and a fourth (58d) fluid tight portion;
   means (32) for displacing said grasping means (28) to a predetermined position between a rearwardly extending position and a forwardly extending position relative to said chassis (12), said displacing means (32) including
      a fluid equalizer ram (36) constituting a cylinder (36b) and a piston (36a) displaceably disposed in said cylinder (36b), said piston (36a) dividing said cylinder (36b) into a first (36c) and a second (36d) fluid tight portion, said piston being connected to said grasping means (28) and said cylinder being joined to said chassis (12);
   selectively actuatable first means (66,68,70,72,78,62',68') for continually biasing said displacing means (32) with a predetermined biasing force toward a selected load skidding position, said first biasing means (66,68,70,72,78,68') permitting displacement of said grasping means (28) away from said load skidding position in response to load-induced forces greater than said biasing force, said first biasing means (66,68,70,72,78,62',68') including
      a fluid reservoir (66);
      means (68,68') for supplying pressurized fluid at a discharge pressure;
      means (70,72,62') for providing fluid communication from said pressurized fluid supply means (68,68') to said first cylinder portion (36c) when said biasing force is desired; and
      means (78,62') for providing fluid communication between said second cylinder portion (36d) and said reservoir (66) when said biasing force is desired; and
   second means (74,96,64') for biasing said tongs (56) toward said closed, minimum opening load grasping configuration with a predetermined grasping force.

2. The load skidding vehicle (10) of claim 1, further comprising:
   means (90) for providing fluid communication between said pressurized fluid supply means (68,68') and said reservoir (66) when said grasping means (28) moves away from said load skidding position.

3. The load skidding vehicle (10) of claim 1, said second biasing means (74,96,64') comprising:
   means (74,64') for providing fluid communication from said pressurized fluid supply means (68,68') to said third (56c) cylinder portion when said tong biasing force is desired; and
   means (96,64') for providing fluid communication between said fourth cylinder portion (58d) and said reservoir (66).

4. The load skidding vehicle (10) of claim 3, further comprising:
   means (94) for obstructing fluid flow from said third cylinder portion (58c) to said pressurized fluid supply means (68) when fluid communication therebetween is provided.

5. The load skidding vehicle (10) of claim 1, further comprising:
   a fluid accumulator (76) in fluid communication with said pressurized fluid supply means (68), said accumulator (76) providing fluid storage at said discharge pressure.

6. The load skidding vehicle (10) of claim 1 further comprising:

means (80) for providing fluid communication between said first (36c) and second (36d) cylinder portions.

7. A load skidding vehicle (10) comprising:
a vehicle chassis (12);
a boom (24) pivotally attached to said chassis (12) and extending rearwardly relative to said chassis (12);
a fluid boom ram (44) pivotally connected to said boom (24) and to said chassis (12);
a grapple assembly (28) including a grapple (50) having a pair of tongs (56), said grapple assembly (28) providing load grasping capability and being subjectable to skidding forces induced by said grasped loads during vehicle movement, said grapple assembly (28) being pivotally connected about a pivot axis (30) to said boom (24);
means (32) for pivoting said grapple assembly (28) about said pivot axis (30) between a rearwardly extending position and a forwardly extending, skidding position, said grapple assembly pivoting means (32) having first and second positions which respectively correspond to said grapple assembly's rearwardly extending position and said skidding position, said pivoting means (32) including
a fluid equalizing ram (36) constituting a cylinder (36b) and a piston (36a) displaceably disposed in said cylinder (36b), one of said piston (36a) and said cylinder (36b) being connected to said grapple assembly (28), the remaining one of said piston (36a) and cylinder (36b) being connected to one of said boom (24) and said chassis (12), said piston (36a) separating said cylinder (36b) into a first (36c) and a second (36d) fluid tight portion;
selectively actuatable means (66,68,70,72,78,62',68') for biasing said grapple assembly pivoting means (32) toward said second position with a predetermined force, said biasing means (66,68,70,72,78,62',68') permitting movement of said grapple assembly pivoting means (32) away from said second position when the skidding force acting on said grapple assembly (28) about said pivot axis (30) is greater than said predetermined force, said biasing means (66,68,70,72,78,62',68') inducing movement of said grapple assembly pivoting means (32) toward said second position when the skidding force acting on said grapple assembly (28) is less than said predetermined force, said biasing means (66,68,70,72,78,62',68') including
a fluid reservoir (66);
means (68,68') for supplying pressurized fluid at a discharge pressure;
means (70,72,62') for selectively providing fluid communication from said pressurized fluid supply means (68,68') to said first cylinder portion (36c); and
means (78,62') for selectively providing fluid communication between said second cylinder portion (36d) and said reservoir (66) when fluid communication between said pressurized fluid supply means (68,68') and said first cylinder portion (36c) is provided;
means (58) for moving said grapple tongs (56) between an open and a closed configuration, said tong moving means (58) having a first and a second configuration which respectively correspond to said open and closed configuration, said tong moving means (58) constituting
a grapple cylinder (58b) and a grapple piston (58a) displaceably disposed in said grapple cylinder (58b), said grapple cylinder (58b) and grapple piston (58a) being connected to different grapple tongs (56), said grapple piston (58a) separating said grapple cylinder (58b) into a third (58c) and a fourth (58d) fluid tight portion; and
means (74,96,64') for biasing said tong moving means (58) toward said second configuration, said tong moving means' biasing means (74,96,64') including
means (74,64') for providing fluid communication between said pressurized fluid supply means (68,68') and said third cylinder portion (58c) and
means (96,64') for providing fluid communication between said fourth cylinder portion (58d) and said reservoir (66).

8. The load skidding vehicle (10) of claim 7 wherein said fluid communication means (70,72,62') and (78,62') are simultaneously actuatable.

9. The load skidding vehicle (10) of claim 7 further comprising:
means (80) for providing fluid communication between said first (36c) and second (36d) cylinder portions to permit said grapple assembly (28) to assume a gravity induced, vertical position.

* * * * *